United States Patent
Blank et al.

(10) Patent No.: US 12,209,616 B2
(45) Date of Patent: Jan. 28, 2025

(54) COUPLER

(71) Applicant: SACS Aerospace GmbH, Empfingen (DE)

(72) Inventors: Eugen Blank, Bösingen (DE); Rolf Kuhm, Sindelfingen (DE)

(73) Assignee: SACS Aerospace GmbH, Empfingen (DE)

( * ) Notice: Subject to any disclaimer, the term of this patent is extended or adjusted under 35 U.S.C. 154(b) by 826 days.

(21) Appl. No.: 17/290,091

(22) PCT Filed: Oct. 25, 2019

(86) PCT No.: PCT/EP2019/079265
§ 371 (c)(1),
(2) Date: Apr. 29, 2021

(87) PCT Pub. No.: WO2020/089111
PCT Pub. Date: May 7, 2020

(65) Prior Publication Data
US 2021/0396273 A1    Dec. 23, 2021

(30) Foreign Application Priority Data

Oct. 31, 2018    (EP) .................................... 18203803

(51) Int. Cl.
*F16G 11/12*    (2006.01)
*F16B 7/18*    (2006.01)
*F16C 7/06*    (2006.01)
*F16C 41/00*    (2006.01)

(52) U.S. Cl.
CPC ............ *F16C 41/001* (2013.01); *F16B 7/182* (2013.01); *F16C 7/06* (2013.01)

(58) Field of Classification Search
CPC .................................. F16B 7/182; F16C 7/06
USPC .................. 188/67, 68; 403/44–48; 74/89.39
See application file for complete search history.

(56) References Cited

U.S. PATENT DOCUMENTS

2012/0224913 A1*  9/2012  Haller ...................... F16C 7/06
403/46

FOREIGN PATENT DOCUMENTS

| DE | 102005006050 B3 | 6/2006 |
|---|---|---|
| EP | 1588975 A2 | 10/2005 |
| EP | 2320100 A1 | 5/2011 |
| GB | 524717 | 8/1940 |

* cited by examiner

Primary Examiner — Christopher P Schwartz
(74) Attorney, Agent, or Firm — Hoffmann & Baron, LLP

(57) ABSTRACT

A coupler for force-transmitting coupling of two components, with a first coupling part having a first coupling interface, with a second coupling part having a second coupling interface, and with a coupling rod which is connected with a first end portion rotatably movable about an axis of rotation to the first coupling part and with a second end portion rotatably movable about the axis of rotation to the second coupling part, wherein the first end portion and the first coupling part form a first thread arrangement for adjusting a distance between the first coupling part and the second coupling part, wherein the first thread arrangement is assigned a first brake system, which is designed for a frictional brake torque transmission between the first coupling part and the first end portion.

18 Claims, 4 Drawing Sheets

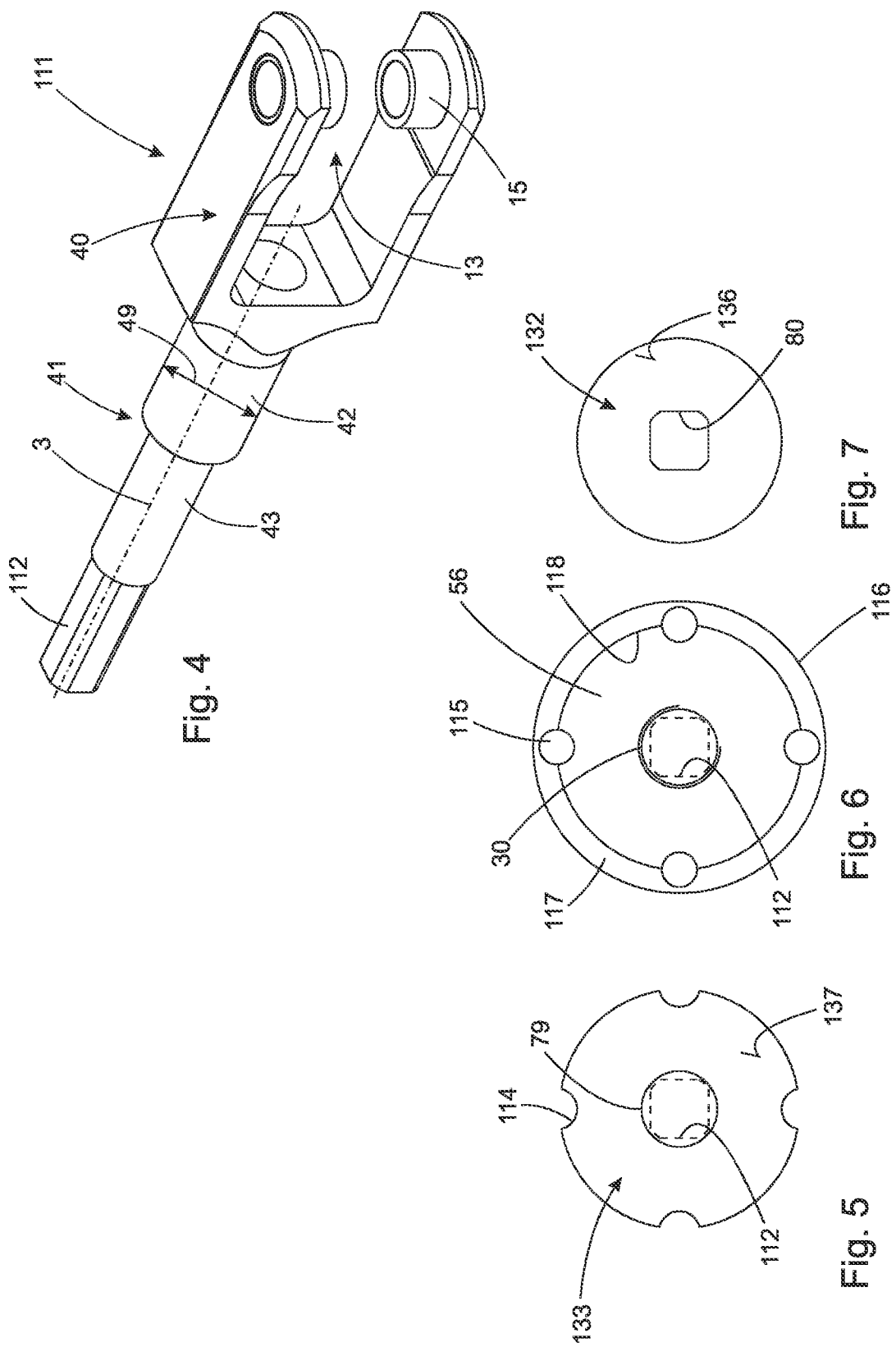

COUPLER

This application claims priority based on an International Application filed under the Patent Cooperation Treaty, PCT/EP2019/079265, filed on Oct. 25, 2019, which claims priority to EP 18203803.4, filed Oct. 31, 2018

BACKGROUND OF THE INVENTION

The invention relates to a coupler for a force-transmitting coupling of two components, comprising a first coupling part having a first coupling interface designed for fixing to a first component, and comprising a second coupling part having a second coupling interface designed for fixing to a second component, and further comprising a coupling rod having a first end portion rotatably connected to the first coupling member about an axis of rotation and having a second end portion rotatably connected to the second coupling member about the axis of rotation, the first end portion and the first coupling member forming a first thread arrangement for adjusting a distance between the first coupling member and the second coupling member.

From EP 1 588 975 A2 a suspension element is known, comprising two fastening elements each having a shaft, wherein at least one shaft has a thread, wherein the suspension element further comprises a center element having in at least one of the end faces a threaded sleeve or a thread cut into the inner surface of the center element and in which the fastening elements engage at the opposing end faces, wherein at least one of the shafts, which have a thread, has on its end face a toothed disc with radially extending teeth which engage in radially extending teeth arranged on the end face of a mating toothed disc, wherein the mating toothed disc is acted upon on its rear face by a spring element.

SUMMARY OF THE INVENTION

The task of the invention is to provide a coupler with a simplified structure which ensures improved assembly.

This task is solved for a coupler of the type mentioned above with the following features: it is provided that the first thread arrangement is assigned a first brake system which is designed for, in particular exclusively, frictionally engaged braking torque transmission between the first coupling part and the first end portion. In contrast to the toothed disk arrangement known from the prior art, the brake system according to the invention allows a sensitive adjustment of the distance between the first coupling part and the second coupling part by a rotational movement of the coupling rod about the axis of rotation. For example it is provided that the second coupling part is exclusively rotatably connected to the coupling rod, so that a rotational movement of the coupling rod does not lead to a relative positional change of the second coupling part with respect to the coupling rod. On the other hand, the first thread arrangement ensures that a rotary movement of the coupling rod about the axis of rotation causes a linear displacement of the first coupling part relative to the coupling rod. If a torque is applied to the coupling rod the same is supported by an attachment of the first coupling part to a first component, which may be a luggage box in an aircraft, for example, and thus a screwing movement takes place in the first thread arrangement. The function of the brake system is to provide a braking torque which acts in addition to the frictional torque in the thread arrangement and prevents an undesired change in the distance between the first coupling part and the second coupling part. The braking torque provided by the brake system may be described by a force oriented normal to a plane that includes the axis of rotation, wherein a force application point for that force is spaced from the axis of rotation. Accordingly, the braking torque acts about the axis of rotation.

It is expedient if the first brake system is designed for a stepless rotary movement between the first coupling part and the first end portion and/or if the second end portion and the second coupling part form a second thread arrangement for adjusting a distance between the first coupling part and the second coupling part and/or if the second thread arrangement is assigned a second brake system which is designed in the same way as the first brake system, in particular identically to the first brake system. The predominantly, in particular exclusively, frictionally acting brake system enables a stepless rotary movement between the first coupling part and the first end portion for stepless adjustment of the distance between the first coupling part and the second coupling part. Furthermore, the first brake system can be realized with simple and thus low-cost components, so that the manufacturing costs for the coupler can be reduced.

Additionally or alternatively, it is provided that the second end portion and the second coupling part comprise a second thread arrangement and, optionally, an associated second brake system. Preferably, it is provided that the first thread arrangement is designed as a right-hand thread and that the second thread arrangement is designed as a left-hand thread, so that a simultaneous change in the relative positions of the first coupling part and the second coupling part with respect to the coupling rod takes place when the coupling rod is rotated about the axis of rotation. Particularly preferably, it is provided that the first thread arrangement and the second thread arrangement have thread pitches of the same amount, so that a synchronous change in the distance of the first coupling part and the second coupling part relative to the coupling rod takes place during a rotation of the coupling rod about the axis of rotation.

Preferably, the first end portion of the coupling rod comprises an adapter sleeve to which a rod portion and/or a tube portion of the coupling rod is fixed and which comprises a first threaded portion screwed to a first threaded section of the first coupling member to form the first thread arrangement. Preferably, the adapter sleeve is used in a dual function. On the one hand, the adapter sleeve comprises a first threaded region which can optionally be designed as an external thread or as an internal thread and is screwed to a corresponding threaded section of the first coupling part and, on the other hand, the adapter sleeve can be used to accommodate the brake system so that the latter can be realized protected, in particular from environmental influences. The adapter sleeve can, for example, be formed integrally as an end portion of the coupling rod. Preferably, it is provided that the adapter sleeve is formed as a separate component which, for example, is connected to a rod section or a tube section of the coupling rod after assembly of the brake system. Particularly preferably, it is provided that the coupling rod has at the end a cup-shaped region which is provided with an internal thread and which can be screwed onto an external thread of the adapter sleeve and fixed there in a rotationally secure manner, in particular by bonding or welding and/or by plastic deformation such as caulking.

Preferably, it is provided that the first threaded section of the first coupling part is designed as an external thread and that the first threaded section of the adapter sleeve is designed as an internal thread. This allows a particularly compact design of the first coupling part and of the adapter sleeve.

In an advantageous further embodiment of the invention, it is provided that the first brake system comprises a friction pad accommodated in a rotationally fixed manner on the first coupling part and a brake plate accommodated in a rotationally fixed manner on the first end portion, the brake lining being accommodated on the first coupling part in a manner displaceable along the axis of rotation and/or the brake plate being accommodated on the first end portion in a manner displaceable along the axis of rotation. In order to be able to ensure an advantageous brake effect for the brake system, it is provided that at least one component from the group of friction pad, brake plate is mounted such that it can be displaced linearly along the axis of rotation in order to ensure a planar contact with the respective other component from the group of friction pad, brake plate. In principle, it can be provided that the friction pad is formed integrally with the first coupling part or that the brake plate is formed integrally on the first end portion of the coupling rod. Preferably, it is provided that both the friction pad and the brake plate are formed as separate components, at least one of which is mounted for displacement along the axis of rotation. It is particularly preferred that both the friction pad and the brake plate are mounted for displacement along the axis of rotation.

In a further embodiment of the invention, it is provided that the first brake system comprises a spring arrangement which is arranged between the first coupling member and the first end portion, the spring arrangement being configured for introducing a normal force component aligned along the axis of rotation onto the friction pad and the brake plate. Preferably, the spring arrangement, the friction pad and the brake plate are adapted to each other such that the braking torque to be applied by the brake system depends on a radial arrangement and extension of the sliding surface formed by the friction pad and the brake plate, a coefficient of friction between the friction pad and the brake plate, and a normal force component aligned along the axis of rotation. The task of the spring system is to always allow a minimum normal force component to act on the friction pad and the brake plate.

It is expedient if the first brake system comprises an adjustment arrangement for adjusting a normal force component aligned along the axis of rotation on the friction pad and the brake plate. Exemplarily, it is provided that the adjustment arrangement is used to adjust a contact pressure between the friction pad and the brake plate in order to influence the braking torque applied by the brake system. Particularly preferably, the adjusting arrangement comprises an adjusting screw, with the aid of which a distance between friction pad and brake plate can be adjusted to influence the normal force component. Alternatively, it can be provided that the adjusting arrangement comprises an adjusting element, in particular one that is mounted so that it can move linearly, which is fixed by form-fitting manner, for example by plastic deformation, and/or in a material-fitting manner after an adjustment of the desired normal force component.

It is advantageous if, at an end portion of the adapter sleeve facing away from the first coupling part, a tube section is formed coaxially with the axis of rotation and the thread arrangement, which tube section has a support groove extending along the axis of rotation on a tube wall and which surrounds the brake plate and the friction pad. With the tube section, the adapter sleeve can fulfil a dual function, on the one hand it serves to receive the brake plate and the friction pad and on the other hand the support groove extending along the axis of rotation is used to support a braking force that occurs due to the interaction of the brake plate and the friction pad during a rotational movement of the coupling rod. Preferably, the tube section is circular cylindrical in shape and the support groove is formed on an inner surface of the tube section. Preferably, it is provided that the support groove penetrates the entire tube wall of the tube section in the form of a slot and extends along the axis of rotation.

Preferably, it is provided that a largest surface of the brake plate and a largest surface of the friction pad are each aligned transversely with respect to the axis of rotation, that the brake plate has at least one projection which extends in the radial direction with respect to the axis of rotation and engages in the support groove, in particular in a form-fitting rotationally fixed manner, and that the friction pad and the first coupling part form a form-fitting rotationally fixed connection. In order to ensure a, in particular exclusively, frictional connection between the first coupling part and the first end portion, it is preferably provided that a largest surface of the brake plate and a largest surface of the friction pad are each formed flat and are each aligned transversely with respect to the axis of rotation. Furthermore, the brake plate is provided with a projection which extends in the radial direction and engages in the support groove formed in the tube section of the adapter sleeve, in order to ensure via this a torque support for the brake plate, in particular one which is rotationally fixed in a form-fitting manner and is preferably linearly movable. It is further provided that the friction pad and the first coupling part are connected to one another in a form-fitting, rotationally fixed, preferably linearly movable, manner in order to ensure torque support here as well. Accordingly, for example, when torque is introduced into the coupling rod, in particular by manually rotating the coupling rod about the axis of rotation, torque can be introduced into the adapter sleeve that is firmly connected to the coupling rod. From there, the torque is transmitted via the support groove and the projection of the brake plate to the brake plate, the largest surface of which is in frictional contact with the largest surface of the friction pad. From there, the frictional torque is transmitted to the friction pad, which in turn transmits this frictional torque as torque, in particular by means of a form fit connection, to the first coupling part.

In an advantageous further embodiment of the invention, it is provided that the brake plate and the friction pad are lined up along the axis of rotation on a carrier part associated with the first coupling part, the carrier part with a non-circular outer geometry engaging freely in a free-wheeling recess in the brake plate and positively in a coupling recess in the friction pad. The carrier part has a function of supporting the torque of the friction pad. It is envisaged that the carrier part with its non-circular outer geometry, which can in particular have a square cross-section, engages positively in a correspondingly formed coupling recess in the friction pad, thereby enabling torque transmission between the carrier part and the friction pad. In contrast, the brake plate is provided with a free-wheeling recess, in particular of circular design, in which a positive coupling with the carrier part does not occur, irrespective of a relative rotational position with respect to the carrier part, so that the brake plate is received on the carrier part in a freely rotatable manner. Preferably, the brake plate and the friction pad are accommodated between an axially aligned end face of the carrier part and an axially aligned contact face of a counterholder mounted on the carrier part so as to be non-rotatable and linearly movable as well as along the axis of rotation at an adjustable distance. Exemplarily, it is provided that the counterholder forms with the carrier part an adjustment arrangement for adjusting a normal force component aligned along the axis of rotation on the friction pad and the brake plate. The contact of the brake plate or the friction pad with an axially aligned end face of the carrier part and the contact of the brake plate or the friction pad with an axially aligned contact face of the counterholder ensure a planar support of the brake plate and the friction pad and an advantageous introduction of normal forces onto the brake plate and the friction pad. With the adjustment arrangement, a distance adjustment can be achieved between the end face of the carrier part and the axial face of the counterholder as well as the brake plate and friction pad received between them in order to influence the normal forces acting between the brake plate and friction pad. This is used to adjust the braking torque that can be provided by the first brake system. Preferably, it is provided that the counterholder is penetrated by a screw which is screwed into the carrier part and the screw head of which is supported on the counterholder, so that by screwing this screw into the carrier part or out of the carrier part, respectively, the distance between counterholder and friction pad can be adjusted It is expedient if the spring arrangement comprises at least one spring from the group: helical spring, corrugated ring spring, spring washer, which spring is prestressed in the axial direction along the axis of rotation. Depending on the selection of the spring, a proportional or progressive or degressive change in the normal force acting between the friction pad and the brake plate can be achieved by adjusting the distance between the counterholder and the carrier part in order to be able to effect the desired adaptation of the braking torque. For example, a number of bores aligned axially along the axis of rotation may be provided in the end face of the carrier part and/or in the contact surface of the counterholder, in each of which bores a helical spring is accommodated which provides the normal force on the brake plate and the friction pad. Alternatively, it is possible to arrange an annular corrugated spring between the brake plate or friction pad and the corresponding end face or contact surface in order to ensure the desired preload for providing a normal force component.

In a further embodiment of the invention, it is provided that a plurality of brake plates and a plurality of friction pads are alternately lined up along the axis of rotation on the carrier part. This multiplies the number of friction surfaces effective for providing the braking torque, each of which is formed between the brake plate and the friction pad, so that a multiplication of the braking torque can also be achieved. By way of example, it can be provided that a coefficient of friction between the brake plate and friction pad is within a predeterminable interval by means of a specific material selection for the brake plate and friction pad. By way of example, it can be provided that the brake plate and the friction pad are each made of metal and that at least one component from the group of brake plate and friction pad is provided with a coating, in particular with a plastic coating or with a sliding film coating, in order to ensure a defined friction pairing.

In an alternative embodiment of the coupler, it is provided that a sleeve section formed coaxially with respect to the axis of rotation and the thread arrangement is formed on an end portion of the adapter sleeve facing away from the first coupling part, which sleeve section bears with an inner circumferential surface against an outer circumferential surface of an expansion sleeve in a frictionally locking manner in order to form the first brake system. In this embodiment of the coupler, a first brake system can also be formed with a minimum number of components, which preferably provides a fixed presettable brake torque that results in particular from the selection of the fit between the outer circumferential surface of the expansion sleeve and the inner circumferential surface of the adapter sleeve that bears thereon in frictional engagement. By way of example, it may be provided that the outer circumferential surface or the inner circumferential surface is formed as a metallic surface or as a plastic surface, in particular as a metallic surface provided with a plastic layer.

In a further embodiment of the invention, it is provided that a brake part is associated with the first coupling part, which brake part is attached to the first coupling part in a rotationally fixed manner, in particular in a stationary manner or in a linearly movable manner with an adjustable spacing, and which brake part comprises a sectionally circular-cylindrical or conical outer circumferential surface which is designed to be received in a coupling recess of the expansion sleeve. In the case of a circular-cylindrical design of the outer circumferential surface of the brake part and a stationary and rotationally fixed attachment of the brake part to the first coupling part, a fixed brake torque is specified. In the case of a conical design of the outer circumferential surface and a rotationally fixed and linearly movable arrangement of the brake part on the first coupling part, an adjusting system can be used to effect an axial displacement of the brake part relative to the expansion sleeve, which is preferably also designed in the shape of a conical section on an inner circumferential surface. This results in a change in diameter for the expansion sleeve, with which an adaptation of the braking torque can be achieved.

BRIEF DESCRIPTION OF THE DRAWINGS

Advantageous embodiments of the invention are shown in the drawing. Here shows.

DETAILED DESCRIPTION

Figure 1:
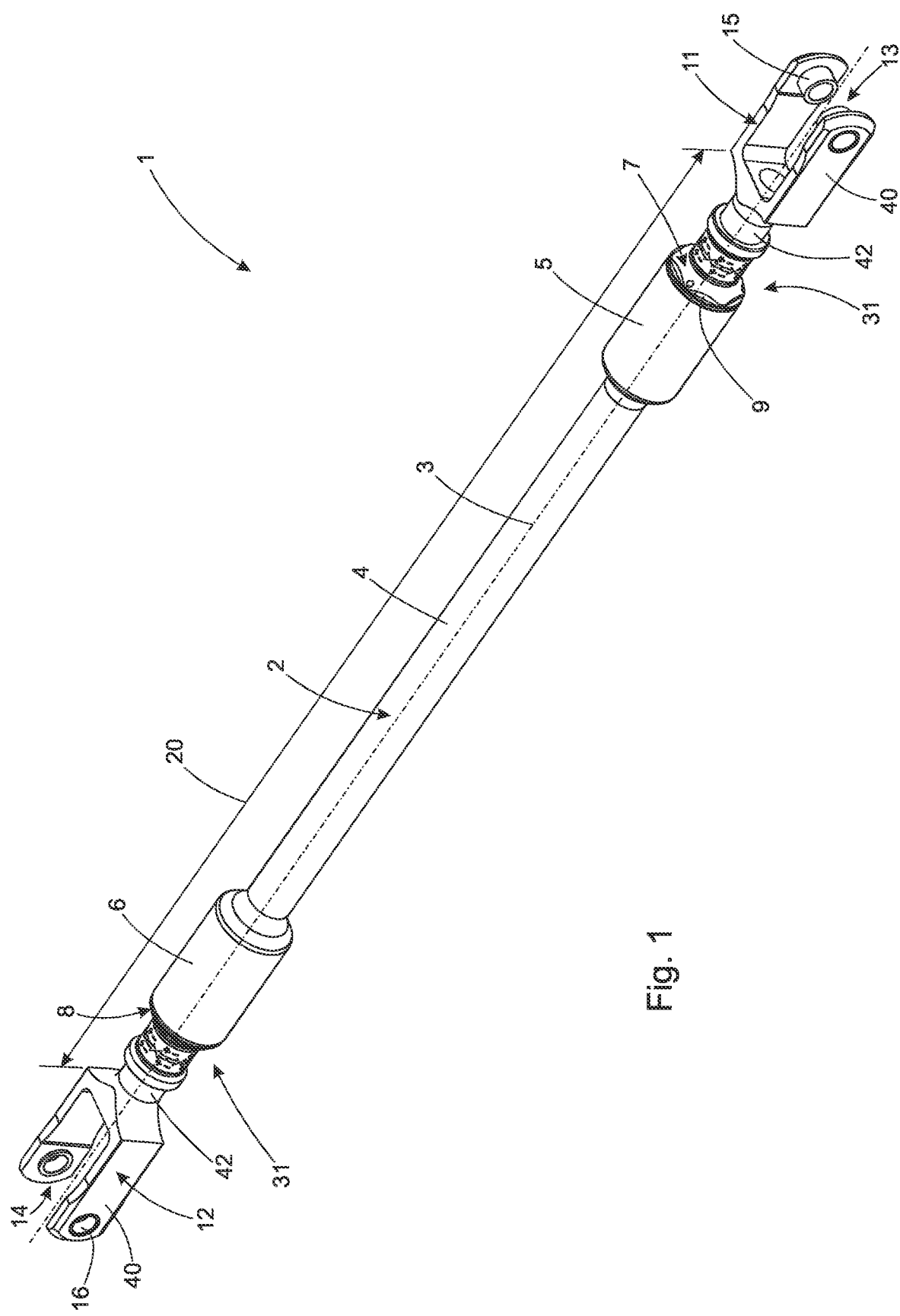
FIG. 1 a perspective view of a coupler with two coupling parts, whereby a brake system is assigned to each of the coupling parts, FIG. 2 a perspective exploded view of a coupling part with the associated brake system, FIG. 3 a perspective view of a variant of a coupling part with associated brake system, FIG. 4 a variant of a coupling part, FIG. 5 a variant of a brake plate, FIG. 6 a variant of an adapter sleeve, and FIG. 7 a variant of a friction pad.

A coupler 1 shown in FIG. 1 is designed to transmit tensile forces and/or compressive forces between a first coupling part 11 and a second coupling part 12. Purely by way of example, the two coupling parts 11 and 12 are designed in the same way, in particular in the manner of an articulated fork. Each of the coupling parts 11, 12 comprises a coupling interface 13, 14, which is designed for coupling to a component not shown in greater detail, for example a support structure of an aircraft or a luggage box to be fastened in the aircraft. For this purpose, bores with first joint bushings 15 and second joint bushings 16 received therein, respectively, are provided on each of the coupling parts 11, 12 with which the desired fixing of the respective coupling part 11, 12 to the component can be effected with the aid of bolts or screws.

The coupler 1 further comprises a coupling rod 2 which extends between the two coupling parts 11 and 12 and which, in purely exemplary fashion, is provided with a central tubular section 4 extending along a central axis 3 and first and second end pieces 5, 6 which are each attached to the end of the tubular section 4 and are of cup-shaped design. Optionally, it may be provided that the tube section 4 and the end pieces 5, 6 are manufactured as separate components and are subsequently firmly joined to one another in a joining process. Alternatively, it may be provided that the tube section 4 and the end pieces 5 and 6 are manufactured in one piece.

Figure 2:
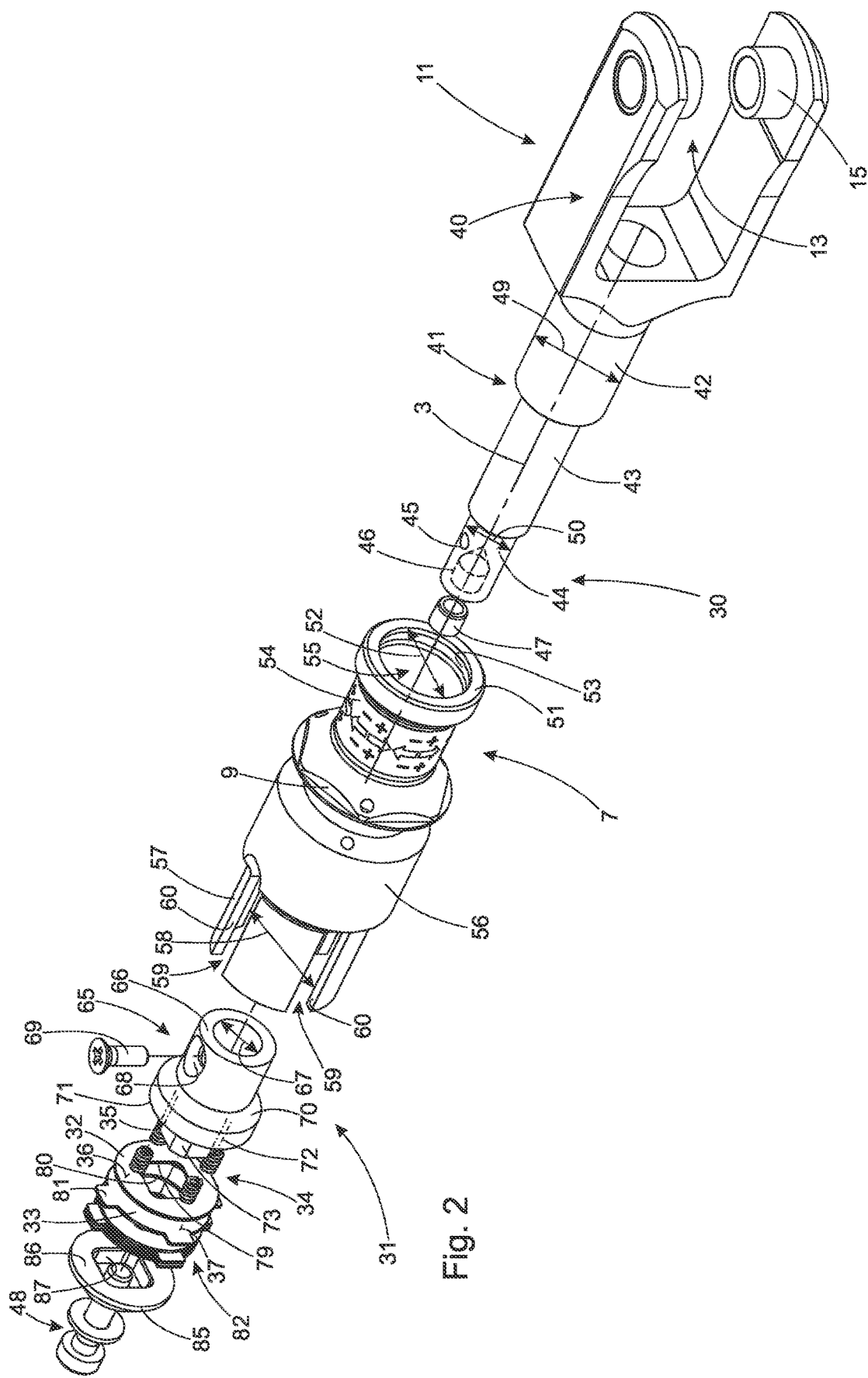

Exemplarily, it is provided that a first adapter sleeve 7 shown in more detail in FIG. 2 is accommodated in the first end piece 5 and that a second adapter sleeve 8 of similar design is accommodated in the second end piece 6.

As will be explained below in connection with FIGS. 2 and 3, the coupling rod 2 and the coupling parts 11 and 12 are adapted to each other in such a way that, when the coupling parts 11 and 12 are fixed in a rotationally fixed manner to components not shown in more detail and when a rotational movement is initiated on the coupling rod 2 about the central axis 3, an adjustment of a distance 20 between the first coupling part 11 and the second coupling part 12 can be effected. By this distance adjustment, the coupler 1 can be used to bring a component to be fastened into a desired spatial position relative to another component.

Exemplarily, it is envisaged to use the coupler 1 for fixing and adjusting the position of luggage boxes within a commercial aircraft. For this purpose, the first coupling part 11 or the second coupling part 12 is connected to a supporting structure on the aircraft fuselage, while the respective other coupling part 11, 12 is connected to a baggage box. Here, it is provided that each of the coupling parts 11, 12 is fixed in a rotationally fixed manner, so that upon a subsequent rotation of the coupling rod 2 about the central axis 3, the desired change in distance between the two coupling parts 11 and 12 can be accomplished. By way of example, it is envisaged that a rotational movement on the coupling rod 2 about the central axis 3 is initiated with the aid of an open-end wrench which can be applied to wrench surfaces 9, 10 of the adapter sleeve 7 or 8, which are aligned parallel to one another in pairs, in order to apply a wrench to the adapter sleeve 7 or 8, respectively, and to apply a wrench to the adapter sleeve 7 or 8, in order to apply a torque to the coupling rod 2. In addition or alternatively, it can be provided that a purely manual torque introduction takes place on the outer surfaces of the end pieces 5 and 6, in this case it is advantageous if these outer surfaces are realized with a defined surface roughness which may be realized for example by applying a knurl. The torque required for rotation of the coupling rod 2 about the central axis 3 is determined, on the one hand, by the thread arrangement 30 described in more detail in connection with FIGS. 2 and 3, which is formed by the coupling rod 2, the respective adapter sleeve 7 or 8 and the associated coupling part 11 or 12. Furthermore, in the embodiment of the coupler 1 according to FIG. 1, it is provided that each of the coupling parts 11, 12 is associated with a brake system 31, 91, also shown in more detail in FIGS. 2 and 3, which is designed to provide a braking torque between the coupling rod 2 and the respective coupling part 11 or 12. 8, in order to apply a torque to the coupling rod 2. In addition or alternatively, it can be provided that a purely manual torque introduction takes place on the outer surfaces of the end pieces 5 and 6, in this case it is advantageous if these outer surfaces are realized with a defined surface roughness (in a manner not shown in more detail) which may be realized for example by applying a knurl. The torque required for rotation of the coupling rod 2 about the central axis 3 is determined, on the one hand, by the thread arrangement 30 described in more detail in connection with FIGS. 2 and 3, which is formed by the coupling rod 2, the respective adapter sleeve 7 or 8 and the associated coupling part 11 or 12. Furthermore, in the embodiment of the coupler 1 according to FIG. 1, it is provided that each of the coupling parts 11, 12 is associated with a brake system 31, 91, also shown in more detail in FIGS. 2 and 3, which is designed to provide a braking torque between the coupling rod 2 and the respective coupling part 11 or 12.

The illustration in FIG. 2 shows a first embodiment of the brake system 31, in which, purely by way of example, a plurality of brake plates 32 and friction pads 33 are lined up alternately along the central axis 3 and are pressed against one another by a spring arrangement 34, which comprises, purely by way of example, four helical springs 35. In this embodiment the brake plates 32 and the friction pads 33 can provide a braking torque due to the frictional contact of their respective largest surfaces 36, 37, which prevents an undesired rotational movement of the coupling rod 2 relative to the respective coupling part 11 or 12.

In the following, the brake system 31 is described in connection with the coupling part 11; the coupling part 12 may be associated with an identical or similar brake system 31 in the same manner.

By way of example, it is provided that the coupling part 11, starting from a U-shaped profiled, fork-shaped fastening section 40, has a shaft 41 extending along the central axis 3, which shaft 41 is graduated, purely by way of example, into three different diameter ranges. Directly adjoining the fastening section 40 is a guide section 42 of circular cylindrical shape, which is adjoined by a threaded section 43 provided with an external thread and which is adjoined by a coupling section 44 of purely exemplary circular cylindrical shape. By way of example, the coupling section 44 comprises a receiving bore 45 aligned transversely to the central axis 3 and a longitudinal bore 46 introduced at the end coaxially to the central axis 3 and shown merely as a dashed line. The longitudinal bore 46 is provided for receiving a spring steel threaded insert 47 which, in interaction with an adjusting screw 48 to be screwed therein, ensures a defined torque for a rotational movement of the adjusting screw 48 relative to the coupling portion 11 about the central axis 3.

Purely by way of example, the adapter sleeve 7 is designed to be essentially rotationally symmetrical with respect to the central axis 3 and comprises a plurality of functional sections which are lined up along the central axis 3 and are preferably integrally connected to one another. Exemplarily, a first functional section facing the coupling part 11 is designed as a circular ring-shaped guide ring 51, the inner diameter 52 of which is adapted to an outer diameter 49 of the guide section 42 in such a way that these components form a smooth-running transition fit with a minimal movement gap. Through this, the adapter sleeve 7 is guided on the coupling part 11 in an advantageous manner with respect to force components possibly occurring during the use of the coupler 1, which force components may be aligned transversely to the central axis 3. Preferably, it can be provided that on the inner diameter 52 of the guide ring 51 a circumferential groove is machined, in which a sliding ring 53, which can preferably be made of a plastic material, in particular designed as an O-ring with additional sealing function, is received, with which a favourable combination of low friction and small movement gap as well as possibly a seal between the guide ring 51 and the guide section 42 can be realized.

Adjacent to the guide ring 51 as a second functional section is a spacer ring 54, the inner diameter 55 of which is selected to be larger than the outer diameter 49 of the guide section 42 in order to ensure free longitudinal movement of the adapter sleeve 7 relative to the first coupling part 11.

Adjacent to the spacer ring 54 as a third functional section is an internally threaded sleeve 56, the inner surface of which, which is not shown in greater detail, is provided with an internal thread which is adapted to the threaded section 43. This forms a thread arrangement in which a distance adjustment along the central axis 3 between the adapter sleeve 7 and the coupling part 11 can be effected by rotating the adapter sleeve 7 relative to the coupling part 11. Furthermore, the internally threaded sleeve 56 can additionally be provided with an external thread, which is not shown in more detail, onto which the respective end piece 5, 6 of the coupling rod 2, which can be provided with a correspondingly formed internal thread, can be screwed.

The internally threaded sleeve 56 is adjoined, as a fourth functional section, by a driver sleeve 57 which, purely by way of example, is designed as a circular cylindrical sleeve and which has an internal diameter 58 which is designed to be considerably larger than the diameter of the threaded section 43 of the coupling part 11. Exemplarily, the carrier sleeve 57 is provided with four guide slots 59 each arranged at 90-degree pitches and formed along the central axis 3 with respective side walls 60 aligned parallel to each other and extending exemplarily along the entire length of the carrier sleeve 57.

Furthermore, the brake system 31 is associated with a carrier part 66 which in turn has three functional sections adapted to the coupling part 11 and the adapter sleeve 7. A first functional section of the carrier part 55 is formed as a coupling rod 66, the inner diameter 67 of which is adapted to an outer diameter 50 of the coupling section 44 of the coupling part 11 in order to enable the carrier part 65 to be pushed onto the shaft 41 of the coupling part 11 with little play. For fixing the carrier part 65 to the coupling part 11, the carrier part 65 is provided in the region of the coupling rod 66 with a transverse bore 68 which is designed to receive a fixing screw 69. The fastening screw 69 is screwed into the receiving bore 45 of the coupling section 44, which is designed as a threaded bore, and thus ensures both a fixing of the carrier part 65 to the coupling section 44 in the longitudinal direction of the center axis 3 and with regard to a torque transmission between the coupling part 11 and the carrier part 65.

Adjacent to the coupling sleeve 66 as a second functional section is a ring part 70, the end face 71 of which, facing away from the coupling part 11 and aligned transversely to the central axis 3, is provided with, purely by way of example, four guide bores 72, extending along the central axis 3 and indicated in FIG. 2 only by dashed center lines, for receiving the cylindrically formed helical springs 35 aligned parallel to the central axis 3.

The helical springs 35 supported in the guide bores 72 are supported, purely by way of example, on a largest surface 36 of the nearest friction pad 32, which in turn bears with its largest surface 36 facing away from the carrier part 65 against the largest surface 37 of the adjacently arranged brake plate 33 in frictional contact. In this connection, it is provided that the friction pad 32 has a recess 79 which is configured in the same way as a third functional section of the carrier part 65, which is configured as a driver 73, in order to permit positive torque transmission between the carrier part 65 and the friction pad 32.

Exemplarily, the recess 80 and the driver 73 are provided with a substantially square profiling along the central axis 3. In contrast, the brake plate 33 is exemplarily provided with a circular recess 80 having a diameter greater than a maximum cross-section of the driver 73 in a cross-sectional plane not shown that is oriented transversely to the central axis 3, so that the brake plate 33 is freely received on the driver 73 and can perform a rotational movement about the central axis 3 relative to the driver 73.

The brake plate 33 is provided with a plurality of projections 81 extending outward in the radial direction from the center axis 3, which engage positively in the guide slots 59 of the driver sleeve 57 and thereby enable torque support of the brake plates 33 on the adapter sleeve 7. A counterholder 85 is arranged along the center axis 3 and is connected with the friction arrangement 82 formed purely exemplarily from four friction pads 32 and three brake plates 33. The counterholder 85 rests with an axially aligned end face 86 against the largest surface 37 of the adjacently arranged friction pad 33 and has a recess 87 which is profiled in the same way as the driver 73 of the carrier part 65, so that the counterholder 85 is also connected to the carrier part 65 in a rotationally fixed manner.

The counterholder 85 and the brake plates 33 and the friction pads 32 are mounted on the driver 73 of the carrier part 65 so that they can move linearly. However they are prevented from moving axially to the greatest possible extent by the force action of the helical spring 35 and by a force action of the adjusting screw 48. The adjusting screw 48 makes it possible to adjust a gap width between the end face 86 of the mating retainer 85 and the helical springs 35, and thereby to adjust a normal force acting on the brake plates 33 and the friction pads 32. Through this, a braking torque transmittable between the coupling member 11 and the adapter sleeve 7 can be varied and adjusted as required.

When assembling the brake system 31 according to FIG. 2, the following procedure is provided: first, the threaded insert 47 is screwed into the longitudinal bore 46 with the aid of a suitable setting tool. Furthermore, the joint bushing 15 resp. 16 are pressed into the corresponding coupling part 11 or 12. Subsequently, the adapter sleeve 7 is pushed onto the shaft 41 of the coupling part 11 after mounting the sliding ring 53, which is in particular designed as an O-ring, and in doing so comes into engagement with the threaded section 43 by means of its internal thread, which is not shown. Subsequently, the adapter sleeve 7 is screwed onto the coupling part 11 using the thread arrangement 30 formed by the internally threaded sleeve 56 and the threaded section 43. Subsequently, the coupling sleeve 66 of the carrier part 65 is pushed onto the coupling section 44 until the transverse bore 68 has come into overlap with the receiving bore 45, in order to subsequently screw in the fastening screw 69 for connecting the carrier part 65 and the coupling part 11. In a subsequent step, the helical springs 35 are inserted into the respective guide bores 72 in the carrier part 65 and then the friction pad s 32 and the brake plates 33 are each placed on the driver 73 in alternating sequence. Subsequently, using the counterholder 85 and the adjusting screw 48, compression of the helical springs 35 takes place until a desired braking torque is realized between the coupling part 11 and the adapter sleeve 7.

Subsequently, it can be provided by way of example that the coupling rod with the cup-shaped end piece 5 according to FIG. 1, which can be provided with an internal thread, is screwed onto the region of the internally threaded sleeve 56 provided with a corresponding external thread, wherein it can be provided in particular that the coupling rod 2 is secured to the adapter sleeve 7 by gluing and/or caulking.

When the adapter sleeve 7 rotates relative to the coupling part 11, torque is introduced from the side walls 60 of the guide slots 59 to the projections 81 of the brake plates 33, as a result of which a relative rotational movement of the brake plates 33 relative to the friction pads 32, which are accommodated in a rotationally fixed manner on the carrier part 65, takes place. A braking torque caused thereby depends on the normal force exerted by the helical springs 35 along the center axis 3 on the friction arrangement 82, as well as on a coefficient of friction between the brake plates 33 and the friction pads 32, and on a geometrical extension of the brake plates 33 and the friction pads 32.

The frictional torque of the friction arrangement 82 is transmitted to the driver 73 via the friction pads 32, which are positively received on the driver 73, and thus to the coupling part 11 via the carrier part 65.

Figure 3:
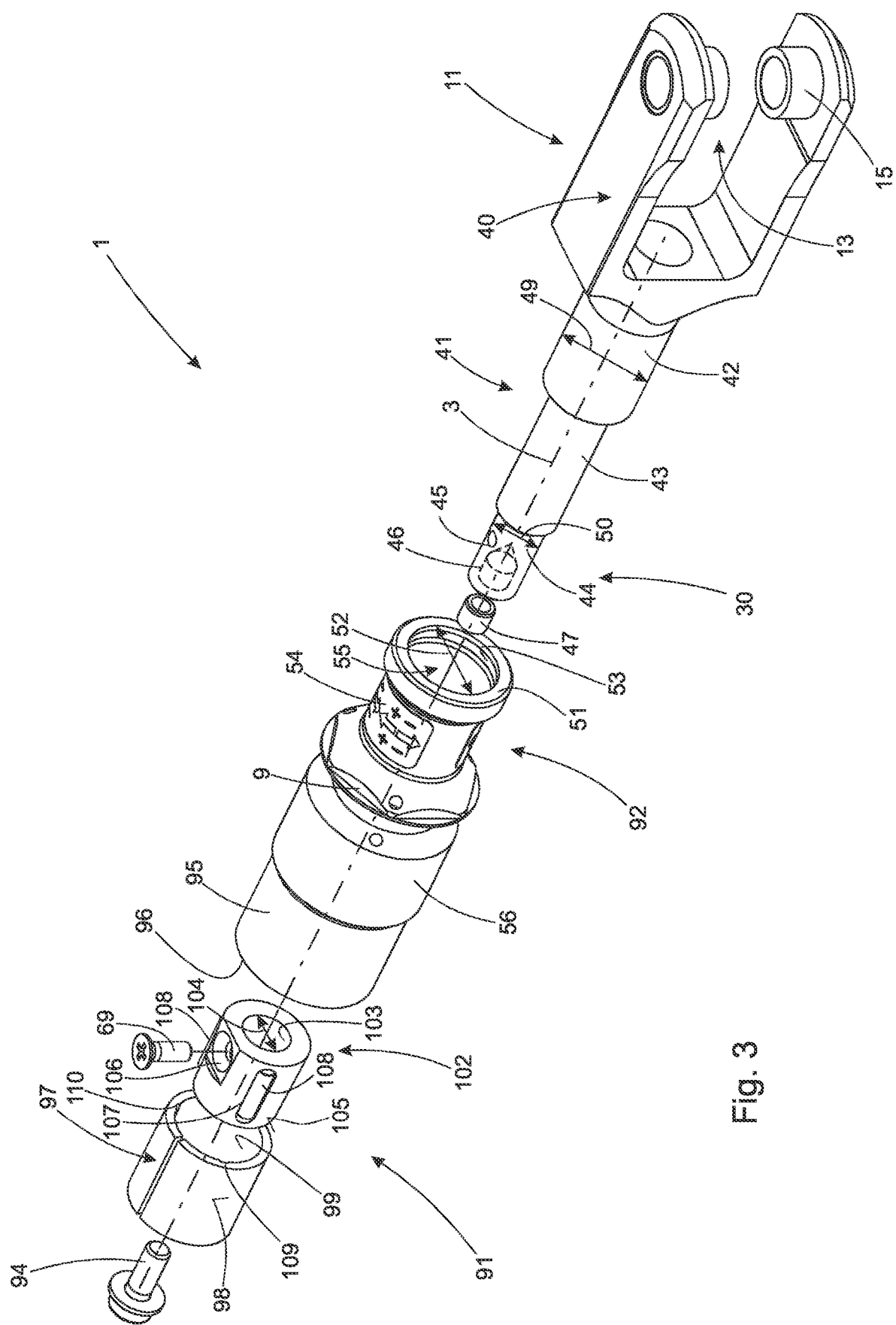

In the alternative embodiment of a brake system 91 shown in FIG. 3, the adapter sleeve 92 has a design which is partially different from the design of the adapter sleeve 7. However the same reference signs are used for identically designed functional sections and no new description is given.

The adapter sleeve 92 differs from the adapter sleeve 7 by a differently shaped third functional section, which is not formed as an internally threaded sleeve but as an internal sleeve 95 and comprises a circular cylindrical recess which is not shown in greater detail and which is formed coaxially with the central axis 3 and starts from an axial end face 96 and extends in the direction of the coupling part 92. This recess is formed for frictional reception of an expansion sleeve 97 provided in place of the carrier part 65. The expansion sleeve 97 has a circular-cylindrical outer surface 98 and a purely exemplary at least substantially circular-cylindrical coupling recess 99. The coupling recess 99 is geometrically adapted to a brake part 102 and enables a linearly movable and torque-transmitting connection between the expansion sleeve 97 and the brake part 102. By way of example, it is provided that the brake part 102 is designed for a rotationally fixed and stationary attachment to the coupling section 44 of the coupling part 11 and, for this purpose, has a recess 103 of purely exemplary circular-cylindrical design with an inner diameter 104 adapted to the coupling section 44. Furthermore, it is provided that on a substantially circular-cylindrical outer surface 105 of the brake part 102, in addition to a transverse bore 106 which is designed to receive a fastening screw 69, two longitudinal grooves 107 are provided, each extending along the central axis 3. In each of the two longitudinal grooves 107, a cylindrical pin 108 is inserted which projects in a radial direction in a ring-like manner beyond the outer surface 105 and which is designed to engage in a longitudinal groove 109 or 110, which are introduced into the coupling recess 99. This provides the desired linearly movable and rotationally fixed coupling between the coupling member 11 and the brake member 102 fixed thereto and the expansion sleeve 97. For its part, the expansion sleeve 97 ensures frictional braking torque transmission with respect to the adapter sleeve 92. In order to limit an axial movement of the expansion sleeve 97, a stop screw 94 is provided which can be screwed into the threaded insert 47 of the coupling part 11. In such an embodiment of the brake system 91, the frictional torque between the coupling part 11 and the adapter sleeve 92 is defined by design.

In order to be able to set a braking torque in the brake system 91, the coupling recess 99 of the expansion sleeve 97 and the outer surface 105 of the brake part 102 are formed in a conical section shape corresponding to one another in a manner not shown in greater detail. In this design variant, an adjustment of an outer diameter of the expansion sleeve 97 can be made by a relative displacement of the expansion sleeve 97 with respect to the brake part 102 with the aid of the stop screw 94, from which the desired frictional torque adjustment with respect to the adapter sleeve 92 results.

The variant of a first coupling part 111 shown in FIG. 4 differs from the first coupling part 11 according to FIG. 2 in that the driver 112, which in purely exemplary fashion is extended with a rounded square profile along the central axis 3, is integrally formed on the first coupling part 111. This considerably simplifies manufacture of the coupler 1 to be equipped therewith, since, for example, manufacture and assembly of the carrier part 65 shown in FIG. 2 can be dispensed with, since this carrier part 65 is functionally replaced by the integrally formed driver 112 in the variant of the coupling part 111 according to FIG. 4.

The components shown in FIGS. 5 to 7 for a brake system constructed similar to the brake system 31 are not shown in greater detail and differ from the components of the brake system 31 in that a torque support of the brake plate 133 is realized by recesses 114 arranged on an outer circumferential surface of the brake plate 133. These recesses 114 can be engaged by dowel pins 115, which are inserted in bores of an adapter sleeve 116. In this case, the dowel pins 115 are arranged with respect to a circular-cylindrical inner surface 118 of a tube section 117 of the adapter sleeve 116 in such a way that longitudinal axes of the dowel pins 115, which are not shown, are oriented parallel to the central axis 3 of the inner surface 118, which is not shown in FIG. 5. The interaction of the dowel pins 115 with the recesses 114 causes a positive rotational connection between the adapter sleeve 116 and the respective brake plate 133, whereby the brake plate 133 can be displaced in a linearly movable manner along the center axis 3 in the tube section 117. Furthermore, it is provided in the same manner as in the case of the brake system 31 that the friction pad or pads 132 with the recess 80, which is designed purely exemplarily as a rounded square, can be received in a form-fitting rotationally fixed manner on the driver 112 of the variant of the first coupling part 111 shown in FIG. 4 or on the driver 73 of the carrier part 65.

Accordingly, a frictional torque transmission is provided between the largest surfaces 136 of the friction pads 132 and the largest surfaces 137 of the brake plates 133 to provide the desired braking effect between the first coupling part 111 and the adapter sleeve 116.

The invention claimed is:

1. A coupler for a force-transmitting coupling of two components, comprising a first coupling part having a first coupling interface designed for fixing to a first component, comprising a second coupling part having a second coupling interface designed for fixing to a second component, and further comprising a coupling rod, having a first end portion which is rotatably connected to the first coupling part about an axis of rotation and having a second end portion which is rotatably connected to the second coupling part about the axis of rotation, wherein the first end portion and the first coupling part comprise a first thread arrangement for adjusting a distance between the first coupling part and the second coupling part and wherein the first thread arrangement is assigned a first brake system which is designed for, frictional braking torque transmission between the first coupling part and the first end portion, and wherein the first end portion of the coupling rod comprises an adapter sleeve to which a rod portion or a tube portion of the coupling rod is fixed and which comprises a first threaded portion screwed to a first threaded section of the first coupling member to form the first threaded assembly.

2. The coupler according to claim 1, wherein the first brake system comprises a friction pad received non-rotatably on the first coupling part and a brake plate received non-rotatably on the first coupling part, wherein the friction pad is received on the first coupling part displaceably along the axis of rotation and wherein the brake plate is received on the first end portion displaceably along the axis of rotation.

3. The coupler according to claim 2, wherein the brake plate and the friction pad are lined up along the axis of rotation on a carrier part associated with the first coupling part, the carrier part engaging with a non-circular outer geometry freely in a free-wheeling recess in the brake plate and engaging positively locked in a coupling recess in the friction pad.

4. The coupler according to claim 3, wherein the brake plate and the friction pad are received between an axially aligned end face of the carrier part and an axially aligned contact face of a counterholder which is mounted on the carrier part in a rotationally fixed and linearly movable manner and at an adjustable distance along the axis of rotation, which forms with the carrier part an adjusting arrangement for adjusting a normal force component aligned along the axis of rotation on the friction pad and the brake plate.

5. The coupler according to claim 3, wherein a plurality of brake plates and a plurality of friction pads are alternately lined up along the axis of rotation on the carrier part.

6. The coupler according to claim 2, wherein the first brake system comprises a spring arrangement arranged between the first coupling part and the first end portion, which spring arrangement is designed for introducing a normal force component aligned along the axis of rotation onto the friction pad and the brake plate.

7. The coupler according to claim 6, wherein the first brake system comprises an adjusting arrangement for adjusting a normal force component aligned along the axis of rotation on the friction pad and the brake plate, and wherein the spring arrangement comprises at least one spring preloaded in axial direction along the axis of rotation from the group: helical spring, wave ring spring, spring ring.

8. The coupler according to claim 2, wherein the first brake system comprises an adjusting arrangement for adjusting a normal force component aligned along the axis of rotation on the friction pad and the brake plate.

9. The coupler according to claim 1, wherein, at an end portion of the adapter sleeve facing away from the first coupling part, there is formed a tube section which is formed coaxially with the axis of rotation and with the thread arrangement, which has on a tube wall a supporting groove extending along the axis of rotation and which surrounds the brake plate and the friction pad.

10. The coupler according to claim 9, wherein a largest surface of the brake plate and a largest surface of the friction pad are each oriented transversely to the axis of rotation, and wherein the brake plate has at least one projection which extends in the radial direction with respect to the axis of rotation and engages in the supporting groove, and wherein the friction pad and the first coupling part form a positively locking rotationally fixed connection.

11. The coupler according to claim 1, wherein, on an end portion of the adapter sleeve facing away from the first coupling part, there is formed a tube section which is formed coaxially with the axis of rotation and with the first thread arrangement, which tube section has on an inner surface at least one projection projecting inwardly in the radial direction from the inner surface and extending along the axis of rotation and which tube section surrounds the brake plate and the friction pad.

12. The coupler according to claim 11, wherein a largest surface of the brake plate and a largest surface of the friction pad are each oriented transversely to the axis of rotation, and wherein the brake plate has at least one recess which extends in the radial direction with respect to the axis of rotation and which recess is designed for an engagement, of the projection in the brake plate, and wherein the friction pad and the first coupling part form a positive-locking rotationally fixed connection.

13. The coupler according to claim 1, wherein, at an end portion of the adapter sleeve facing away from the first coupling part, there is formed a sleeve section which is formed coaxially with respect to the axis of rotation and with respect to the thread arrangement and which bears with an inner circumferential surface against an outer circumferential surface of an expansion sleeve in a frictionally locking manner in order to form the first brake system.

14. The coupler according to claim 13, wherein the first coupling part is assigned a brake part which is attached to the first coupling part in a rotationally fixed manner, and which comprises a sectionally circular-cylindrical or conical outer circumferential surface which is designed to be received in a coupling recess of the expansion sleeve.

15. The coupler according to claim 1, wherein the first brake system is designed for a stepless rotary movement of the first coupling part relative to the first end portion or wherein the second end portion and the second coupling part have a second thread arrangement for setting a distance between the first coupling part and the second coupling part and wherein the second thread arrangement is assigned a second brake system which is designed in the same way as the first brake system.

16. The coupler according to claim 1, wherein the first threaded section of the first coupling part is formed as an external thread and wherein the first threaded portion of the adapter sleeve is formed as an internal thread.

17. A coupler for a force-transmitting coupling of two components, comprising a first coupling part having a first coupling interface designed for fixing to a first component, comprising a second coupling part having a second coupling interface designed for fixing to a second component, and further comprising a coupling rod, having a first end portion which is rotatably connected to the first coupling part about an axis of rotation and having a second end portion which is rotatably connected to the second coupling part about the axis of rotation, wherein the first end portion and the first coupling part comprise a first thread arrangement for adjusting a distance between the first coupling part and the second coupling part, wherein the first thread arrangement is assigned a first brake system which is designed for frictional braking torque transmission between the first coupling part and the first end portion, wherein the first end portion of the coupling rod comprises an adapter sleeve with which a rod portion or a tube portion of the coupling rod is fixed and which comprises a first threaded portion screwed to a first threaded section of the first coupling member to form the first threaded assembly, wherein the first brake system comprises a friction pad received non-rotatably on the first coupling part and a brake plate received non-rotatably on the first coupling part, wherein the friction pad is received on the first coupling part displaceably along the axis of rotation and wherein the brake plate is received on the first end portion displaceably along the axis of rotation and wherein the first brake system comprises an adjusting arrangement for adjusting a normal force component aligned along the axis of rotation on the friction pad and the brake plate.

18. A coupler for a force-transmitting coupling of two components, comprising a first coupling part having a first coupling interface designed for fixing to a first component, comprising a second coupling part having a second coupling interface designed for fixing to a second component, and further comprising a coupling rod, having a first end portion which is rotatably connected to the first coupling part about an axis of rotation and having a second end portion which is rotatably connected to the second coupling part about the axis of rotation, wherein the first end portion and the first coupling part comprise a first thread arrangement for adjusting a distance between the first coupling part and the second coupling part, and wherein the first thread arrangement is assigned a first brake system which is designed for frictional braking torque transmission between the first coupling part and the first end portion, wherein the second end portion and the second coupling part have a second thread arrangement for setting a distance between the first coupling part and the second coupling part and wherein the second thread arrangement is assigned a second brake system which is designed in the same way as the first brake system.

* * * * *